Nov. 20, 1934.　　A. E. LARSEN　　1,980,999
AIRCRAFT HAVING SUSTAINING ROTORS
Filed Sept. 23, 1931　　2 Sheets-Sheet 1

INVENTOR
Agnew E. Larsen
BY
Synnestvedt & Lechner
ATTORNEYS

Nov. 20, 1934.  A. E. LARSEN  1,980,999
AIRCRAFT HAVING SUSTAINING ROTORS
Filed Sept. 23, 1931  2 Sheets-Sheet 2

INVENTOR
Agnew E. Larsen
BY
Synnestvedt & Lechner
ATTORNEYS

Patented Nov. 20, 1934

1,980,999

UNITED STATES PATENT OFFICE 1,980,999

AIRCRAFT HAVING SUSTAINING ROTORS

Agnew E. Larsen, Huntingdon Valley, Pa., assignor to Autogiro Company of America, Philadelphia, Pa., a corporation of Delaware Application September 23, 1931, Serial No. 564,515

2 Claims. (Cl. 244—19)

This invention relates to aircraft having sustaining rotors and is especially concerned with the type of craft in which the sustaining rotor consists of a plurality of blades extended radially from a central upwardly directed axis mechanism about which the set revolves in flight operation.

The type of sustaining rotor to which the present invention relates is that which includes a plurality of pivots or articulations for the various blades, adjacent to the central axis or hub mechanism, which are provided for the purpose of permitting the blades to assume various different positions of equilibrium under the influence of inertia, lift, drag and anti-drag, and other flight forces.

The present invention is particularly concerned with a mechanism for driving aircraft sustaining rotors of the type above described, especially for purposes of initiating rotation of the rotor prior to takeoff from the ground.

It might also be noted, at this point, that this invention contemplates certain improvements over structures of the type described and claimed in the copending application, Serial No. 562,865, filed Sept. 15, 1931, of Juan de la Cierva, assignor to the assignee of this application.

In the aforementioned copending application, several arrangements of fluid pressure devices adapted for use in driving aircraft sustaining rotors of the type here in question are disclosed. This invention also contemplates the utilization of fluid pressure means and is more specifically concerned with a novel rotor driving mechanism which is operable under the influence of impulses set up in a liquid, the said liquid serving as the means through which power is transmitted from the body of the craft to the rotor itself, the latter ordinarily being mounted a substantial distance above the body in order to provide for certain pendular stability in flight as well as to afford ample clearance between the sustaining blades and other portions of the craft, such as the propeller or the empennage, so that the blades will not strike or foul upon any other portions of the structure.

Various other distinctions and advantages of the arrangement herein disclosed, over that of the copending application above referred to, will appear more clearly from consideration of the following description. However, before proceding with the description, the following objects and advantages should be noted.

Generally considered, the present invention has in view simplification of the rotor driving mechanism, particularly with respect to the mechanical parts thereof, as well as with respect to efficiency from the standpoint of total weight of parts employed.

The present invention also contemplates a novel disposition and arrangement of the driving or starter mechanism in combination with the rotor hub or axis and its supporting structure, so that transmission of power from the body of the craft to the rotor hub is direct and positive and, at the same time, is accomplished by transmission means which may conveniently be disposed adjacent to and streamlined with portions of the rotor mounting structure. It should also be noted that the transmission means is such as to provide for extension thereof from any conveniently located power source in the body of the craft to the rotor, since the power transmission means may take the form of flexible tubing or the like.

As a further object, the present invention has in view an arrangement of parts which does not require or necessitate loss of operating fluid, nor, indeed, any large transfer of fluid between the power source and the rotor, as will appear more fully hereinafter.

The structure of this invention makes use of a pair of motor devices each including complementary cylinder and piston arrangements, the former of which are interconnected by tubing for the transmission of fluid impulses therebetween. In this way, in the event of leakage of fluid from any one of the cylinder interconnecting tubes or conduits, the function of the device may still be carried out by the remaining pairs of complementary cylinders.

Various objects and advantages of the invention are considered only briefly above, since they will appear more clearly and to better advantage from a consideration of the following description making reference to the accompanying drawings, in which Figure 1 is a somewhat diagrammatic side view of an aircraft of the type here involved to which the apparatus of this invention has been applied;

Figure 3 is a vertical sectional view through a portion of the driving mechanism which is disposed adjacent to the rotor axis or hub, the view being taken on the line 3—3 of Figure 4 and showing certain associated parts.

Figure 1:
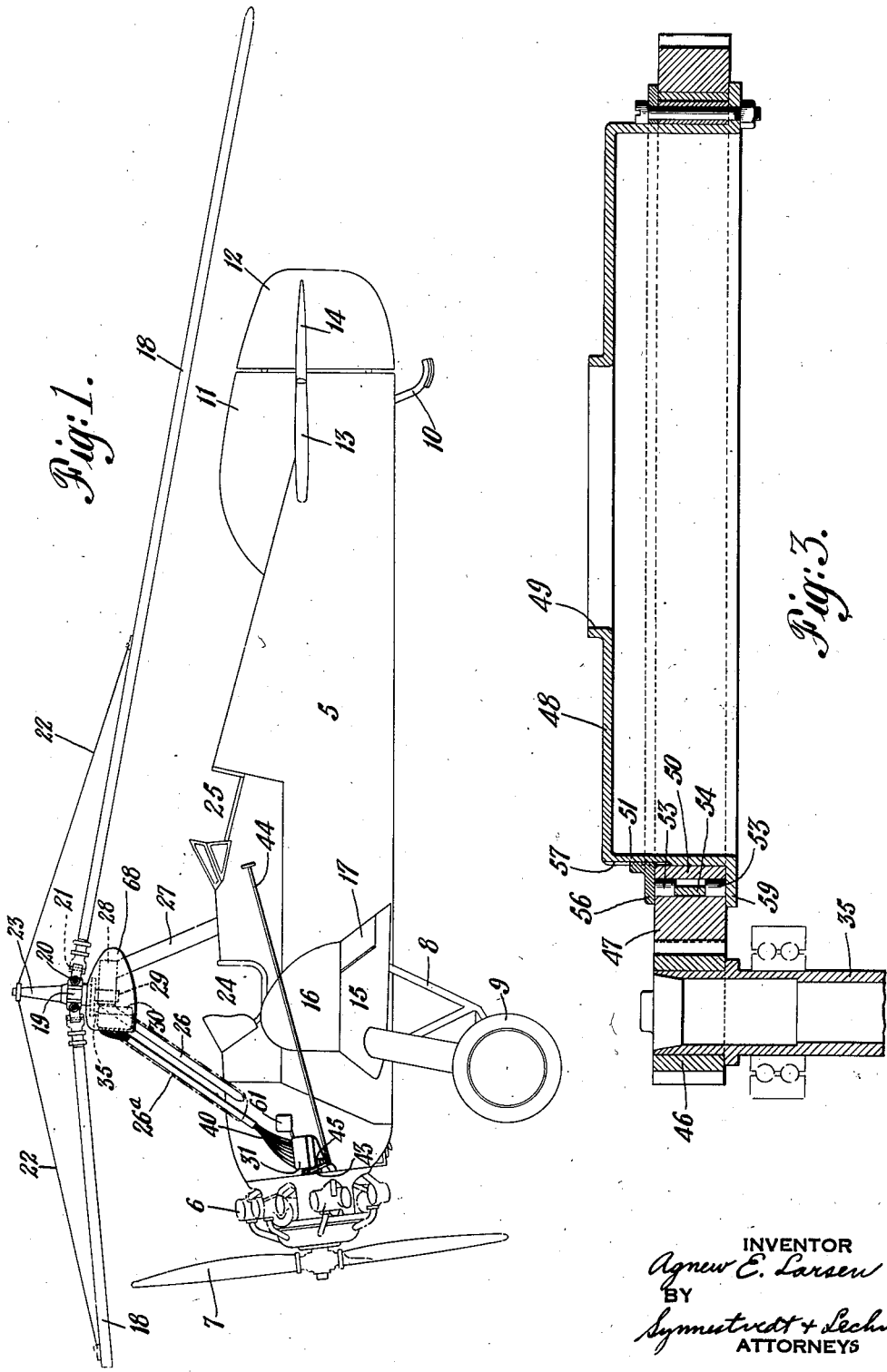

In considering the various figures, reference should first be made to Figure 1 in which the body of the craft 5 is illustrated as being equipped with an engine 6 at the forward end thereof for driving the propeller 7. The craft also includes alighting mechanism including the undercarriage and wheels 8—9 and a tail skid 10. Toward the rear end of the body 5, fixed and controllable vertical and horizontal surfaces 11, 12, 13 and 14 are disposed to constitute an empennage structure. Small supplemental fixed wings 15 may also be employed at the sides of the craft and are preferably provided with upturned tips 16, the fixed wings 15 further serving to support aileron controls 17.

The rotor itself includes a plurality of sustaining blades 18 (only two are shown in Figure 1, but it is to be understood that any desired number may be employed) which are pivoted or articulated to the central hub or axis mechanism 19 on horizontally disposed as well as vertically disposed pivot pins 20 and 21. In order to support the blades or wings 18 when they are inactive or rotating substantially below flight speeds, "droop" cables 22, attached to the upwardly extended mast or post 23, may be employed.

The rotor and its axis mechanism are mounted preferably above one of the cockpits 24—25 by means of a plurality of post or leg elements 26 and 27. In this instance, I have employed two forward post elements 26 extended upwardly and rearwardly from the sides of the craft to be joined and interbraced with a single rear post 27 which extends upwardly substantially centrally of the body of the craft. The joining or interbracing of the three post elements, if desired, may be effected by means of a structure indicated at 28 as supporting a rotor spindle or axis part 29 about which the hub part 19 rotates.

Before proceeding with a description of the rotor driving or starting mechanism itself and the manner of application thereof, it should be observed that I do not herein broadly claim the use of a three legged or "tripod" rotor supporting or pylon structure, since this subject matter is embodied in the copending application, Serial No. 497,745, filed November 24th, 1930, of Juan de la Cierva, assignor to the assignee of this application.

In the particular embodiment illustrated, I have shown a motor device 30 as being mounted adjacent the rotor head or hub between the two forward pylon legs 26, in which position this device may conveniently be supported by attachment to the structure 28. The motor device 30 is complementary to and cooperates with an additional device 31 which is disposed in the body of the craft adjacent to the engine 6.

Figure 2:
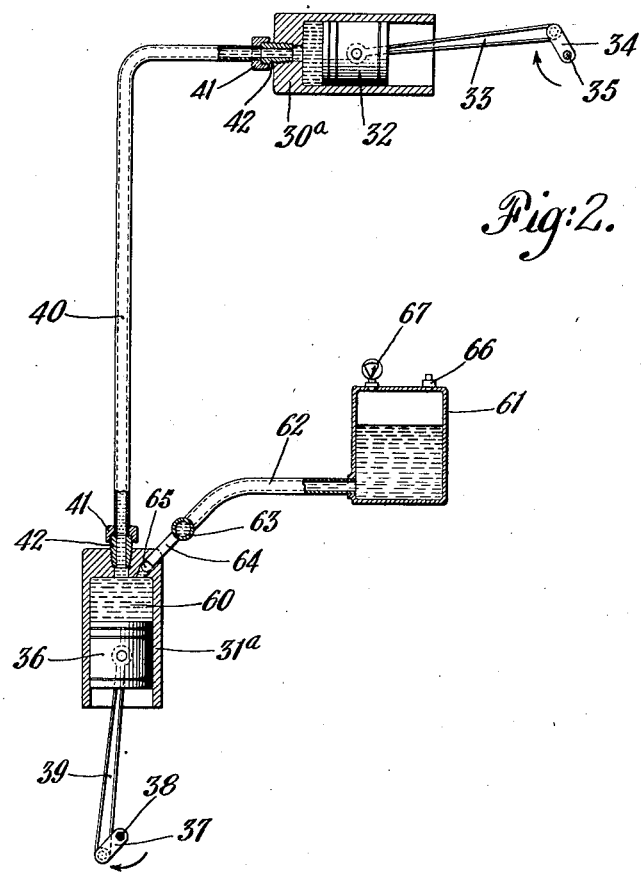
Figure 2 is also a somewhat diagrammatic view, this view illustrating, partly in section and partly in elevation, various portions of the cylinder and piston motor devices, and associated parts, which I prefer to employ.

The character and construction of the two motor devices will be more apparent from inspection of Figure 2 which illustrates one cylinder of each of the devices in cross section, and also other associated parts in section as well as in elevation. One of the group of cylinders which is embodied in the upper motor 30 is indicated at 30a. In the cylinder 30a a piston 32 is arranged to reciprocate and is connected by means of the connecting rod 33 with a crank 34 of the shaft 35. The motor 31 similarly includes a plurality of cylinders, one of which is indicated at 31a in which a piston 36 is arranged to reciprocate, the piston being coupled with crank 37 of shaft 38 by means of a connecting rod 39.

As will also be apparent from inspection of Figure 2, the various cylinders of the two motors 30 and 31 are interconnected in pairs by means of pipes or tubes 40, preferably of the flexible type, suitable connection means 41 and 42 being provided for this purpose.

The various cylinders of each motor, furthermore, are associated with respect to their crank shafts after the manner of the piston and crank shaft arrangements of well known internal combustion engines. Upon filling each pair of cylinders, and the interconnecting tube therefor, with a suitable fluid such as oil, positive drive or rotation of the crank shaft of one motor will produce corresponding or similar movement or rotation of the crank shaft of the other motor.

I have therefore coupled the crank shaft of the motor device 31 with the engine 6 (either to the main shaft of this engine or to one of its auxiliary shafts) preferably through a clutch 43. A control member 44 may be extended from the pilot's cockpit 25 forwardly to actuate the clutch 43 through a crank or lever 45. This connection, therefore, serves to actuate the motor 31 when the clutch is engaged and, upon actuation or rotation of this motor, corresponding movement is produced in the motor 30 by transmission of fluid impulses through the cylinder interconnecting tubes 40. While in Figure 2, for the sake of clarity, I have illustrated only one pair of cylinders in the two complementary motor devices, it will be understood that any suitable number may be employed in each one of the devices. For example, as somewhat diagrammatically illustrated in Figure 1, I have employed eight-cylinder arrangements for each of the motors 30 and 31. Still further, in Figure 1, it will be seen that the eight tubes 40 may conveniently be extended adjacent to a forward pylon leg 26, although, if desired, the tubes may be divided into two groups one of which extends adjacent one of the forward legs 26 and the other adjacent the other leg. In any event, the tubing may be streamlined with one or both of the pylon posts as indicated, for example, at 26a in Figure 1.

Figure 4:
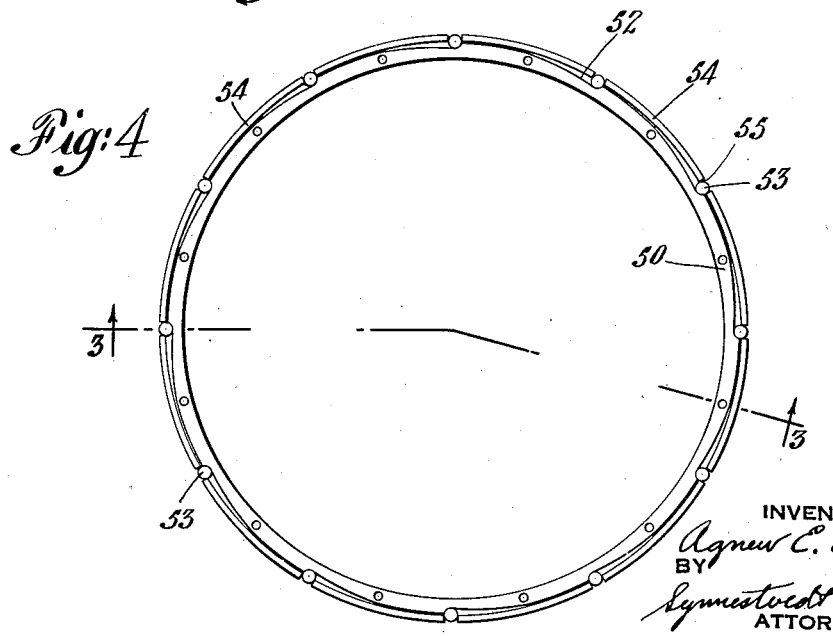
Figure 4 is a detail top plan view of various parts shown in Figure 3.

The connection between the upper motor 30 and the rotor itself is also somewhat diagrammatically illustrated in Figure 1 but appears in more detail in Figures 3 and 4. In these latter figures, it will be seen that the shaft 35 has mounted thereon a pinion 46, this pinion being arranged to mesh with a ring gear 47 mounted peripherally of the drum structure 48. The drum structure, in turn, is centrally apertured as at 49 to engage a portion of the hub 19 and transmit torque thereto and in order to provide for free overrunning of the rotor with respect to the driving mechanism, I prefer to interpose an automatic overrunning clutch mechanism between the gear 47 and the drum 48. It will be understood, of course, that an overrunning clutch of any suitable type may be employed and also that the clutch itself may be disposed with relation to the driving connections in some manner other than the particular one herein illustrated. However, the arrangement shown cooperates neatly with other portions of the driving and motor arrangements and, as seen in Figures 3 and 4, includes a ring 50 mounted externally of and secured to the cylindrical wall 51 of the drum 48. This ring 50 has somewhat elongated and tapered recesses 52 formed in its outer surface to engage rollers 53, the latter being positioned by means of an additional ring 54 which is suitably apertured or cutout as at 55 to space and position the various rollers 53. A flanged part 56, keyed to the drum as at 57, may be employed to cooperate with the outturned lip or flange 59 of the drum itself to form an annular cavity in which the roller clutch device proper is mounted.

In operation, movement of the ring gear 47 in one direction, provides for similar movement of the rollers 53 about the drum periphery until such rollers are rigidly engaged between the inner surface of the gear itself and the tapered surfaces or grooves in the ring 50. The rotor is free to overrun the driving or starter mechanism, including the gear 47, since such overrunning automatically returns the rollers 53 toward the deep ends of the grooves 52, so that the gear and the drum are, in effect, disengaged.

Turning again to Figure 2, it should be noted that the liquid with which the cylinders and their interconnecting tubes are filled is indicated at 60. The supply of this operating liquid may be maintained by means of a reservoir 61 having a connection 62 with a manifold 63 from which individual or independent pipes 64 are extended to the various cylinders of one of the motor devices. A ball check valve 65 serves to prevent flow of the operating fluid from the motor cylinders back into the supply reservoir 61.

While a supply reservoir may be mounted above both of the operating motors, for example, in association with the rotor head or hub, in order to provide for flow of liquid therefrom into the cylinders by gravity, I prefer to dispose the supply reservoir within the body of the craft and so construct the various parts as to supply operating fluid to the cylinders under pressure. To this end, a connection 66 is provided in the container 61, this connection preferably being of any convenient one-way valve type which will permit introduction of air therethrough, as by means of a small hand pump or the like. A pressure gauge 67 may also be provided.

In starting a craft equipped with my invention, the forward propulsion engine 6 is first started and, while idling or at least running relatively slowly, the control 44 is manipulated by the pilot to engage the clutch 43. This, of course, provides for rotation of the shaft 38 of the motor unit 31, which in turn effects similar rotation of the shaft 35 of the unit 30 in the manner set forth more fully above. The clutch device associated with the drum 48 then becomes engaged and the rotor blades together with the hub structure begin to rotate. When the blades have acquired the necessary speed, a takeoff may be effected, and just prior to or approximately at that time the clutch device 43 is again disconnected so that all portions of the driving mechanism proper come to rest.

The particular arrangement of overrunning clutch herein disclosed is not claimed in this application per se, but only in combination with various other portions of the structure, as a clutch of this particular type is described and claimed in tne copending application, Serial No. 512,383, filed January 30th, 1931, of Joseph S. Pecker, assignor to the assignee of this application. This clutch arrangement, around the drum 48, furthermore, is of especial advantage when used in combination with rotor braking mechanism, for example, in the manner described and claimed in the copending application, Serial No. 545,451, filed June 19th, 1931, of Joseph S. Pecker, assignor to the assignee of this application.

A clutch of this general type, however, is particularly advantageous when used in association with the driving mechanism above described, it being noted that this driving mechanism with its motor device 30 disposed between a pair of rotor pylon posts neatly cooperates with the drum 48 and its associated clutch (as well as with a rotor brake which may be provided if desired), so that, among other things, the motor unit 30, the pylon structure 28, the brake mechanism and the clutch itself may all conveniently be streamlined within a casing such as that indicated in Figure 1 at 68. A removable cover plate may, of course, be arranged, for example, at the forward side of the housing 68, to provide access to the motor and associated parts. Parasite drag or head resistance are, therefore, reduced to a minimum and, in addition, the extension of the power transmitting means to the upper motor unit does not necessitate the use of any large exposed parts, so that the aerodynamical efficiency of the craft, in general, is considerably enhanced.

According to the foregoing the preesnt invention provides for positive and direct transmission of driving power from a source disposed in the body of the craft to the rotor hub. This is accomplished, furthermore, by the use of mechanical parts and the like which are very simple and rugged in construction as well as readily inspected or repaired. It is significant to note that no complicated valves, gearing and other driving parts, or the like, are employed.

The invention is further of advantage since it does not require the transmission, transfer or circulation of large quantities of operating fluid from the body of the craft to the rotor, either in a closed circuit or through a single line system providing for discharge of the operating fluid adjacent the rotor head, but operates primarily on the principle of the transmission of a series of overlapping fluid impulses.

Since the cylinder interconnecting tubes may be made of the flexible type, as well as of relatively small size, an installation of the character here contemplated may conveniently be made to substantially any arrangement of rotor mounting structure. In other words, the power transmitting tubes are of a character or type which readily lend themselves to extension in various different directions and finally upwardly to the rotor axis adjacent to or through a wide variety of different rotor mounting structures. The particular arrangement illustrated in Figure 1, however, is of advantage since the disposition of the pylon legs provides for convenient and very direct extension of the power transmission means from the source in the body of the craft to the rotor, and for an advantageous location of the driven motor between the two front legs of the pylon where the motor may be secured to both legs if desired.

What I claim is:—

1. In an aircraft, an autorotative sustaining rotor having a hub providing a generally upright axis, a supporting structure for mounting the rotor hub above the body of the craft including a pair of supporting elements extending upwardly and rearwardly from the body structure toward the rotor hub, said elements being spaced from each other transversely of the craft adjacent to said hub, and a rotor starter mechanism including a rotor driving motor positioned in forwardly offset relation with respect to the rotor axis and nested and mounted between said elements at the upper ends thereof just below the general plane of the rotor, the motor including a rotative driving member the axis of which is forwardly offset from the rotor axis, together with a cooperating rotative driven member mounted on the rotor hub concentrically thereof.

2. In an aircraft, an autorotative sustaining rotor having a hub providing a generally upright axis, a supporting structure for mounting the rotor hub above the body of the craft including three supporting elements constituting a tripod, two of said elements being extended upwardly and rearwardly from the body structure toward the rotor hub and the other being extended upwardly and forwardly from the body toward the hub, said two elements being spaced from each other transversely of the craft adjacent to said hub, and a rotor starter mechanism including a rotor driving motor positioned in forwardly offset relation with respect to the rotor axis and nested and mounted between said two elements at the upper ends thereof just below the general plane of the rotor, the motor including a rotative driving member the axis of which is forwardly offset from the rotor axis, together with a cooperating rotative driven member mounted on the rotor hub concentrically thereof.

AGNEW E. LARSEN.